United States Patent [19]
Abelitis

[11] 4,229,226
[45] Oct. 21, 1980

[54] METHOD FOR THE PRODUCTION OF CEMENT CLINKER LOW IN SULPHUR

[75] Inventor: Andris Abelitis, Rösrath, Fed. Rep. of Germany

[73] Assignee: Klöckner-Humboldt-Wedag AG, Fed. Rep. of Germany

[21] Appl. No.: 974,610

[22] Filed: Dec. 29, 1978

[30] Foreign Application Priority Data

Dec. 31, 1977 [DE] Fed. Rep. of Germany ....... 2759249

[51] Int. Cl.$^2$ .............................................. C04B 7/36
[52] U.S. Cl. .................................................. 106/100
[58] Field of Search ....................................... 106/100

[56] References Cited
U.S. PATENT DOCUMENTS 3,212,764  10/1965  Muller et al. ........................ 106/100

Primary Examiner—James Poer
Attorney, Agent, or Firm—Hill, Van Santen, Steadman, Chiara & Simpson

[57] ABSTRACT

A method and apparatus for the production of cement clinker low in sulphur from a calcium carbonate containing particulate raw material in an installation containing a multi-stage suspension gas preheater, a sintering furnace and a material cooler. A portion of the sulphur-containing exhaust gases issuing from the sintering furnace is separated, and the separated portion is preheated in the gas preheater. The material is heated in the hottest stage of the preheater to a temperature below the deacidification temperature. A reducing medium is added to the thus heated material. The remaining portion of the sulphur-containing exhaust gases is removed from the system for disposition.

4 Claims, 1 Drawing Figure

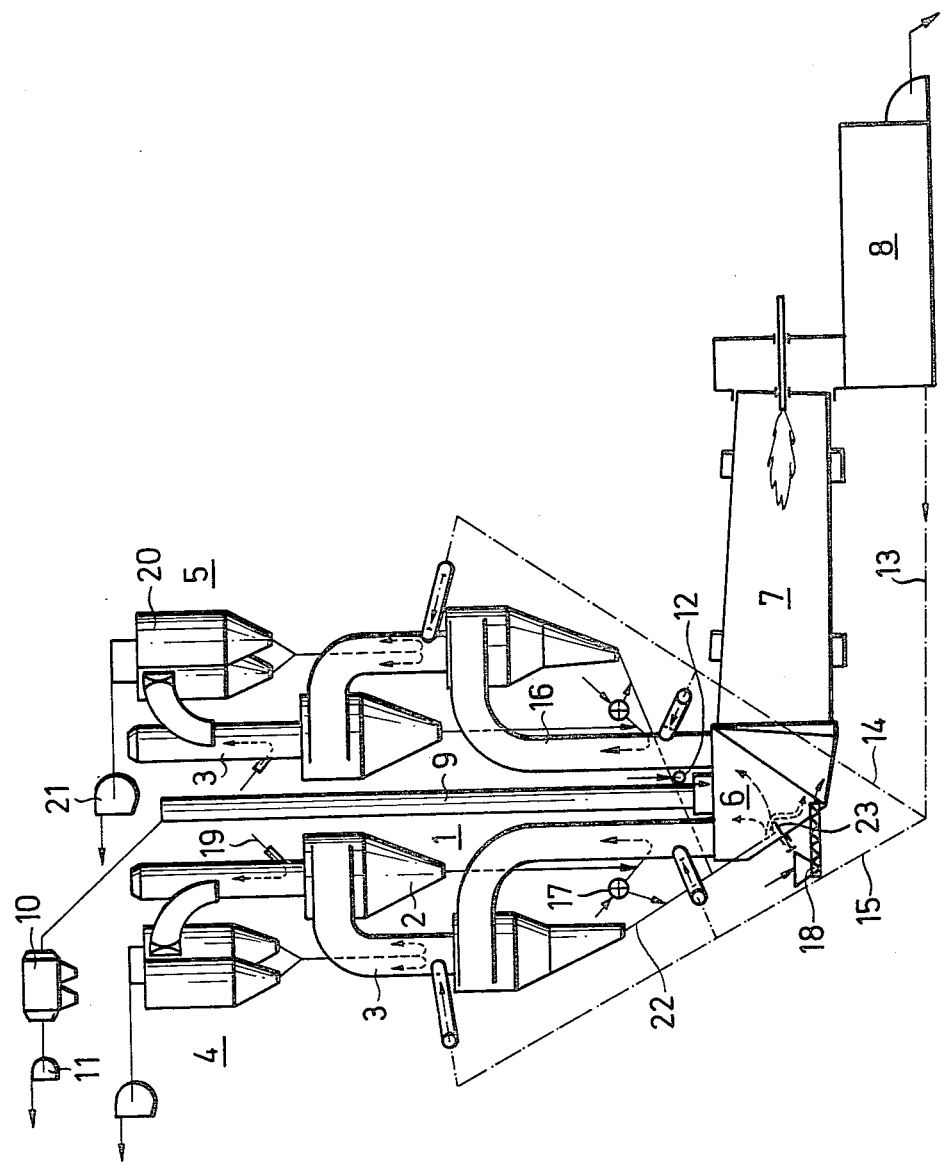

METHOD FOR THE PRODUCTION OF CEMENT CLINKER LOW IN SULPHUR

DESCRIPTION OF THE PRIOR ART

In the calcium-carbonate-containing technical comminuted materials which in the so-called normal method are calcined in modern heat-saving calcination installations with suspension-gas preheater and rotary kiln to cement clinker, sulphur occurs almost exclusively in sulfidic or sulfatic combinations. At the high temperatures, as they are required for the clinker calcination, the sulphur combinations are converted to sulphur oxides. As the thermodynamic equilibrium between the two sulphur oxides $SO_2$ and $SO_3$ at temperatures above 1,000° C. lies almost preponderantly on the side of the quadrivalent sulphur-combinations, there results as end product of the conversion of the sulphur-containing combinations: sulphur dioxide. Also, the combustion of gases of a rotary kiln contain each according to the type of fuel, sulphur dioxide up to 0.4% by volume. The sulphur dioxide as a whole contained in the hot gases of the calcination installation is converted with the alkalies and earth-alkalies contained in the pulverized raw materials, into alkali-sulfates. The primary potassium oxide resulting from the silicate-type combinations of the minerals of the pulverized raw material, reacts in the presence of sulphur-dioxide to:

$$K_2O + SO_2 + \tfrac{1}{2}O_2 = K_2SO_4$$

with the formation of potassium sulfate.

The alkali sulfates are thus for the greatest part discharged with the clinker from the clinker-cooler of the calcination installation.

If the calcium-carbonate-containing pulverized raw materials contain sulphur-containing combinations to such an extent that the sulphur dioxides contained in the hot gases of the calcination installation are not converted by the alkalies or earth-alkalies to sulfates, then the excess $SO_2$ reacts with the CaO deacidified from calcium-carbonate to calcium oxide, to calcium-sulfate, and indeed according to the following reaction:

$$4\,CaO + 4SO_2 = 3CaSO_4 + CaS$$

The sulphur-combinations taken up and formed of the pulverized raw material, upon entry into the combustion zone of the rotary kiln, attain again the high temperature at which the sulphur combinations are again so converted that as end product, free sulphur dioxide is present in the hot gases of the calcination installation. Thereby, all the prerequisites are given for a so-called sulphur-circulation.

Sulphur-circulation operations with calcination installations supplied with pulverized raw material are always dangerous then when the concentration of circulation-forming constituents becomes too high in the hot temperature area of the suspensiongas preheater, as the circulation combinations forming have a eutectic mixture in the range of 800° to 1000° C., and with increasing content of liquid phase of the flow conditions of the pulverized raw material is strongly influenced at the outlet of the preheater in the rotary kiln, which leads to an undesired formation of deposits in the transition area preheater rotary kiln, and leads under certain circumstances to disturbances in the operation.

Similar problems of detrimental circulation procedures in the material and gas-flow of a cement calcination installation are known per se in the case of the so-called alkali-circulations, whereby the alkalies are introduced with the raw materials into the calcination system. In order to reduce the alkali-content of the cement produced from alkali-containing raw material, bypass-conduits are arranged above the gas-outlet-end of rotary kilns, in order to divert approximately a 10% part of the gases laden with alkali-dusts out of the furnace directly into the atmosphere (German Laid Open Specification No. 2,161,411). Such a solution does not permit, however, of being applied to the problems of sulphur-circulations in calcination-installations, which operate according to the normal methods and preheat calcium-carbonate-containing pulverized raw material with high-sulphur-containing combinations in a suspension-gas-preheater and calcinate in the preheater to a fargoing extend to CaO. For, a superproportionally high portion of $SO_2$-containing furnace-exhaust gases would have to be removed from the system, which means a great heat-loss and thereupon a diminished reduction to the thermal degree of effectiveness of the installation. Beyond this, the $SO_2$ contained in the residual gas reacts with the pulverized raw material already calcinated to CaO in the suspension-gas preheater, quantitatively to calcium-sulfate, so that outside of the high heat losses, further sulphur-circulations in the system and the disadvantageous results connected therewith must be taken into consideration.

SUMMARY OF THE INVENTION

It is the object of the invention, therefore, to furnish a method and an apparatus for the production of cement clinker low in sulphur from sulphur containing technical pulverized raw material according to the so-called normal method, without having to take into consideration losses in heat and additionally to prevent sulphur-circulations in the installation system to a fargoing extent.

This object is solved according to the invention thereby, that through a substantial part of the sulphur-containing exhaust gases issuing from the sintering furnace, after at the most a three-stage preheating of the material in the hottest stage of the suspension-gas-preheater to a temperature below the material-deacidification temperature, preferably to 600° to 800° C., that a reduction medium is added to the heated material, and that the other part of the sulphur-containing-furnace-exhaust gases, in a manner known per se, is removed from the calcination process. The, at the most, three-stage heating of the material to a temperature of 600° to 800° C. prevents in the most advantageous manner a CaO-formation in the suspension-gas-preheater and thereupon a reaction between the $SO_2$ of the furnace-exhaust-gases and the CaO to $CaSO_4$, which otherwise with the high temperatures in the conduits and cyclones of the suspension-gas-preheater leads in increased measure to formation of deposits and agglomerations. At the same time, through the addition of reduction media, the decomposition of the sulfate-combinations in the materials is improved and the sulphur-volatility increased. In this way, the portion of $SO_2$ in the hot furnace exhaust gases is so strongly concentrated that only a small partial quantity of the hot furnace exhaust gases needs to be removed from the system, in order to prevent almost completely sulphur-circulations and to produce with high thermal degree of effectiveness, a cement clinker low in sulphur even from strongly sulphur-containing starting material.

In development of the invention, it is suggested that fresh air and/or cooler-hot-air is introduced in the hottest stage of the suspension-gas-preheater and/or in the preheating stage connected in series with this stage. Hereby, the sulphur-volatility of the pyrite or sulfidic combinations in the starting material is increased already in the preheater, so that the sulphur in form of volatile $SO_2$ can easily be removed from reactions of CaO and $SO_2$.

In further embodiment of the invention, it is provided that the reduction medium is introduced into the material stream leaving the hottest stage of the preheater.

According to a further embodiment of the invention, it is provided that the quantity of exhaust-gas-portion removed from the calcination process before charging into the atmosphere is cooled and purified, so that the dust contained in the furnace-exhaust-gas is quenched below the eutectic point and may be separated off from the gases without the danger of deposits by means of E-filters. The sulphur-dioxide is subsequently washed out of the gases in a manner known per se.

According to a preferred embodiment of the invention, it is provided that a part of the quantity of material issuing from the hottest stage of the preheater is conveyed into circulation between rotary kiln and this hottest stage. In this manner, care is additionally taken that eventual material cakings of the inner wall of the gas-withdrawal conduit connecting the furnace and the preheater are already prevented in the deposits.

The invention relates also to an apparatus for carrying out the method, consisting of a calcination installation, with cyclone-heat-exchangers operating according to the suspension-gas-principle, which is connected in series with a rotary kiln, whereby the rotary kiln and the cyclone-heat exchanger are in connection on the hot gas side with a material cooler.

According to the invention, the rotary kiln is connected through at least one exhaust-gas-conduit with the surrounding atmosphere, and through at least one exhaust-gas-conduit with at least one heat exchanger-strand of an at the most three-stage cyclone-heat-exchanger, and at least in each case the hottest stage of the cyclone-heat-exchanger has at least one inlet for a reduction medium. The advantage of this measure lies therein that the reduction medium, among other things, may be introduced into the exhaust-gas-conduit extending between the furnace-inlet-head and the lowermost cyclone, and undergoes distributed finely granularly an intimate mixture with the material heated to circa 600° to 800° C.

It is suitable that in the material inlet area of the rotary kiln and/or in its exhaust-gas-conduit and/or in the lowermost cyclone and/or in the area of the material outlet conduit of this lowermost cyclone is arranged the feed for the reduction medium. Reduction media of coarse-grain-composition may accordingly, for example, be entered in the transition area from the rotary kiln to the suspension-gas-preheater. Through combination with the addition of fine-grained reduction medium in the hottest stage and of coarse-grained reduction medium in the furnace-inlet-head, the decomposition and the increase in the sulphur volatility of the sulfate-combinations are accurately controlled in the material over the length of the rotary kiln.

In development of the invention, it is provided that at least the hottest stage in each case of the cyclone heat exchangers has at least one inlet for a gaseous medium, preferably for fresh air and/or cooler-hot-air, so that already in the heat exchanger for the increase in the sulphur-volatility of the pyrite or sulfidic combinations in the material, the quantity of air required for the purpose is available.

In further preferred embodiment of the invention, it is provided that in the material-inlet-area of the rotary kiln in the material stream, at least one slidable baffle-element is arranged, so that advantageously an adjustable quantity of material conveyed into circulation is available for the cleansing of the gas-conveying conduits and for the lowering of the gas-temperature.

BRIEF DESCRIPTION OF THE DRAWING

The FIGURE shows one embodiment of an apparatus for carrying out the process of the invention.

DESCRIPTION OF THE PREFERRED EMBODIMENT

The invention will be described in greater detail on the basis of an embodiment by way of example, from which further features of the invention are to be inferred.

In the disclosed figure, an installation is illustrated of cement clinker low in sulphur of calcium-carbonate-containing and sulphur-containing technical pulverized raw material. The calcination installation consists of a three-stage cyclone-heat-exchanger 1 operating according to the suspension-gas-principle, whereby each heat exchanger stage consists of separating cyclone 2, 20 and gas feed conduit 3, 16. The cyclone heat exchanger 1 has two heat exchanger lines 4, 5, in each case constructed similarly and having similar stages, these latter heat exchanger lines being in connection with the furnace inlet head 6 of a rotary kiln 7. Rotary kiln 7 and cyclone heat exchanger 1, on their part, are in connection on the hot gas side with a material cooler 8. On the furnace inlet head 6 is additionally attached a bypass conduit 9 which is in connection through a dust-removing device 10 and a blower 11 with the surrounding atmosphere. On this bypass conduit 9 is provided directly on the furnace inlet head 6 a cold-air-blower 12 for the cooling of the hot bypass gasses.

The material cooler 8 is in connection through hot-air-conveying conduits 13, 14, 15 with the particular heat exchanger line 4, 5, and indeed so that both in the furnace-exhaust-gas-conduit 16 of the hottest cyclone stage in each case as well as also in the gas conduit 3 of the preheating stage arranged in each case above the hottest stage, an air supply is made possible. In the inlet for cooler-exhaust-air are arranged adjusting members of ordinary type of construction, not shown in greater detail, for the regulation of the supplied quantity of air.

On the furnace-exhaust-gas conduit 16 is arranged an inlet 17 for a fine-grained reduction medium. In the material inlet area of the rotary kiln is arranged a further inlet for coarse-grained reduction medium, for example, a conveyor worm 18 connected with a storage container.

The uppermost heat exchanger stage of each heat exchanger line 4, 5 has in the pertaining exhaust gas conduit 3 an inlet 19 for the fine-grained cold material, and a double-cyclone 20 which on its part is in connection with an induced-draft blower 21.

In the operation of the calcination installation, for the production of cement clinker low in sulphur, out of sulphur-containing technical pulverized raw material, according to the so-called normal method, (contrary hereto is the cement production according to the so-called gypsum sulphur-acid method with calcium-sulfate-containing starting material)—the calcium-carbonate-containing material at 19 is charged into the gas conduit 3 of the uppermost heat exchanger stage of a heat-exchanger-line 4, 5. The fine-grained material is preheated stagewise in the heat exchanger 1 with the hot gases from the rotary kiln 7 connected in series on the material side with the heat exchanger 1. After separation of the sulphur-containing material in the double-cyclone 20 of the uppermost heat exchanger stage of each heat exchanger line, the material is introduced into the gas conduit 3 of the heat exchanger stage arranged therebelow. Through the cooler-hot-air introduced into this gas conduit, the sulphur-volatility of the pyrite or sulphidic combinations in the materials is increased, so that the sulphur in form of volatile $SO_2$ is present in the hot gases and through the induced draft blower 21 of each heat exchanger line may easily be removed from the calcination installation. The material already reduced in sulphur content is then introduced together with fine-grained reduction medium into the furnace-exhaust-gas conduit 16 of the hottest cyclone stage and in this stage is heated solely to a temperature of 600° to 800° C. so that only non-substantial portions of free CaO are present, which may enter with the $SO_2$—laden exhaust gases from the rotary kiln into undesired $CaSO_4$ combinations. The fine-grained reduction medium is then together with the material heated to 600° to 800° C. withdrawn from the lowermost heat exchanger stage and in the furnace-inlet-head 6 of the rotary kiln is intermixed with coarse-grained reduction medium from the conveyor worm 18. The fine-grained reduction media disintegrate the sulphur in the material in the front part of the rotary kiln and thus increase the sulphur-volatility of the sulfate-combinations, while the coarse-grained reduction media serve subsequently for the disintegration and for the raising of the sulphur volatility of the sulfate combinations still remaining in the material. Hereby is attained a high concentration of the sulphur-oxide present in the hot gases of the rotary kiln, so that without great heat loss a part of the strongly $SO_2$—containing exhaust gases may be removed from the system through the bypass conduit 9 and the electrofilter 10. The clinker low in sulphur burnt to completion in the furnace is discharged from the material cooler 8 through withdrawal devices, not shown in greater detail, from the calcination installation.

I claim:

1. In a method for the production of cement clinker low in sulphur from a sulphur and calcium carbonate containing particulate raw material which involves sequentially preheating said material in a plurality of successive preheating stages of progressively increasing temperatures, sintering the preheated material in a sintering furnace to produce sulphur containing hot exhaust gases, and cooling the resulting sintered material in a cooler, the improvement which comprises:

separating a portion of said sulphur containing exhaust gases issuing from said sintering furnace, passing the separated portion into the hottest zone of said preheating stages, heating the raw material in contact with said separated portion to a temperature below the deacidification temperature in said hottest stage, adding a reducing agent to the thus heated raw material, sintering the thus treated raw material and reducing agent in said sintering furnace, and removing the remaining portion of said sulphur-containing exhaust gases issuing from said sintering furnace from the system without passing the same into said preheating stages.

2. A method according to claim 1 which includes the step of adding a relatively coarse reducing material to the preheated raw material as it enters said sintering furnace.

3. A method according to claim 1, which includes the step of:

introducing cooler air into the hottest stage of the suspension gas preheater.

4. A method according to claim 1, in which:

said remaining portion of sulphur-containing exhaust gases is cooled and purified before being released into the atmosphere.

* * * * *